(12) United States Patent
Chen et al.

(10) Patent No.: US 7,706,429 B2
(45) Date of Patent: Apr. 27, 2010

(54) BOC SIGNAL ACQUISITION AND TRACKING METHOD AND APPARATUS

(75) Inventors: Chun-nan Chen, Taipei (TW); Jui-Ming Wei, Taichung (TW)

(73) Assignee: MediaTek Inc., Hsin-Chu (TW)

( * ) Notice: Subject to any disclaimer, the term of this patent is extended or adjusted under 35 U.S.C. 154(b) by 831 days.

(21) Appl. No.: 11/533,142

(22) Filed: Sep. 19, 2006

(65) Prior Publication Data

US 2008/0069187 A1 Mar. 20, 2008

(51) Int. Cl.
*H04B 1/707* (2006.01)
(52) U.S. Cl. ...................................... 375/147
(58) Field of Classification Search .............. 375/147, 375/150
See application file for complete search history.

(56) References Cited

U.S. PATENT DOCUMENTS

| 7,286,592 | B2* | 10/2007 | Pietila et al. ............... 375/147 |
| 7,375,680 | B2* | 5/2008 | Watson et al. ........... 342/357.02 |
| 7,486,717 | B2* | 2/2009 | De Wilde et al. ............ 375/150 |
| 7,555,033 | B2* | 6/2009 | Lillo et al. ................... 375/150 |
| 2003/0231580 | A1 | 12/2003 | Martin et al. |
| 2005/0270997 | A1 | 12/2005 | Julien et al. |
| 2006/0097915 | A1* | 5/2006 | Martin et al. .......... 342/357.15 |

* cited by examiner

*Primary Examiner*—Kevin Y Kim

(57) ABSTRACT

A BOC signal acquisition and tracking apparatus and method. In the present invention, a BOC subcarrier, a QBOC subcarrier and harmonics thereof are used as subcarriers. Those subcarriers can be mixed with a received signal and integration result of each mixing result is calculated. Then, all the integration results are combined as a combined correlation. Alternatively, those subcarriers can be combined as a synthesized subcarrier. The synthesized subcarrier is mixed with the received signal, and the integration of the mixing result is calculated to obtain a synthesized correlation.

20 Claims, 5 Drawing Sheets

BOC SIGNAL ACQUISITION AND TRACKING METHOD AND APPARATUS

TECHNICAL FIELD OF THE INVENTION

The present invention relates to processing of binary offset carrier (BOC) modulated signals (simply referred to as BOC signal hereinafter), more particularly, to a method and apparatus for processing BOC signals in acquisition and tracking modes of a satellite navigation receiver.

BACKGROUND OF THE INVENTION

Nowadays, more than one Global Navigation Satellite System (GNSS) is available. A receiver supporting multi-specification LBS (location based service), wireless multimedia communication and broadcasting signals is becoming an expectation. Take multi-specification LBS as an example, such a receiver able to support multi-mode receiving for GNSS signals can enhance locating precision and access to more services. Among the GNSS systems, different signal frequency bands support different services. As more and more bands need to be supported, band overlapping occurs.

GPS is the U.S. navigation satellite system, which is a network of satellites continuously transmits high-frequency radio signals. The signals carry time and distance information that is receivable by a GPS receiver, so that a user can pinpoint the position thereof on the earth. Galileo, the emerging European satellite navigation system, offers higher signal power and more robust modulation that will enable users to receive weak signals even in difficult environments. When combined, Galileo and GPS will offer twice the number of satellite sources as currently available. This provides redundancy as well as greater availability for the user. The combination of GPS and Galileo basically has four bands, excluding SAR (Safe and Rescue) service. GPS and Galileo systems share some signal bands. That is, GPS and Galileo share some central frequencies and send signals on the same ones of carriers. For example, GPS L1 and Galileo E2-L1-E1 share the same band. To reduce inter-system and intra-system interference, specific modulation schemes are required. Binary offset carrier modulation (hereinafter simply referred to as "BOC") is a widely used method.

The BOC modulation is done by multiplying a pseudo-random noise (PRN) spreading coded signal (simply referred to as PRN coded signal hereinafter) with a square wave subcarrier (SC). The SC has a frequency which is multiple of the code rate of the PRN spreading code. FIG. 1 is a waveform diagram showing the BOC modulation. The BOC-sine (simply referred to as BOC) signal is generated by mixing a SC-sine and a PRN coded signal, while the BOC-cos (also referred to as QBOC, where Q indicates "quadrature-phase".) is generated by mixing an SC-cos and the PRN coded signal.

The BOC signal has a symmetric split spectrum with two main lobes shifted from the center frequency by the frequency of the subcarrier. The characteristics of the BOC signal are dependent on the spreading code chip rate, the subcarrier frequency, and the subcarrier phasing within one PRN code chip. The common notation for a BOC-modulated signals in the GNSS field is represented as BOC(fc, fs), where $f_c$ is the code chip rate, and $f_s$ is the frequency of the subcarrier. Both fc and fs are usually represented as a multiple of the reference frequency 1.023 MHz. Therefore, the BOC signal can also be represented as BOC(n,m), where n is the multiple of 1.023 MHz for the PRN code chip rate fc, and m is the multiple of 1.023 MHz for the subcarrier fs.

For satellite signal navigation, the BOC signal is preferably applied in tracking under white noises. Such scheme provides better inherent multipath mitigation compared to the spreading code alone. However, BOC scheme makes acquisition and tracking more difficult due to a multiple peak autocorrelation phenomenon. The presence of the subcarrier in the BOC signal introduces secondary peaks in a range of −1/+1 chip in BOC autocorrelation. FIG. 1 is a diagram showing autocorrelation of BOC(1,1). That is, BOC(1,1) correlates with BOC(1,1). As shown, there are two troughs at both sides of the main peak in the middle. To calculate correlation power, square of correlation is usually used. Accordingly, the two troughs will cause two secondary peaks in view of correlation power. Such secondary peaks may cause a problem of mis-lock. That is, a receiver may lock the secondary peak rather than the main peak, and therefore resulting in erroneous tracking. A significant deviation of approximately 150 m would occur in the range measurement. Such an error is unacceptable in navigation.

SUMMARY OF THE INVENTION

An objective of the present invention is to provide a BOC signal acquisition and tracking apparatus. The apparatus comprises a carrier unit generating a carrier; a code unit generating a BOC subcarrier, a QBOC subcarrier and harmonics of the BOC and QBOC subcarriers; and a code delay block receiving a signal, removing a carrier component from said signal by using said carrier from the carrier unit, respectively mixing the signal with the subcarriers output from the code unit, and integrating the mixing results; a combination unit combining the integration results to generate a combined correlation; and a discriminator generating a tracking error according to the combined correlation. The apparatus further has a controller. The controller controls the code unit to output which ones of the QBOC subcarrier and the harmonics of the BOC and QBOC subcarriers. In addition, the controller or the combination unit determines a coefficient for each integration result to be combined.

Another objective of the present invention is to provide a BOC signal acquisition and tracking apparatus. The apparatus comprises a carrier unit generating a carrier; a code unit generating a BOC subcarrier, a QBOC subcarrier and harmonics of the BOC and QBOC subcarriers; a combination unit receiving the subcarriers and harmonics thereof, combining the same and outputting a synthesized subcarrier; a code delay block receiving a signal, removing a carrier component from said signal by using said carrier from the carrier unit, mixing the signal with the combined subcarrier, and integrating the mixing results; and a discriminator generating a tracking error according to the integration result. The apparatus further has a controller. The controller controls the code unit to output which ones of the QBOC subcarrier and the harmonics of the BOC and QBOC subcarriers. In addition, the controller of the combination unit determines a coefficient for each subcarrier to be combined.

A further objective of the present invention is to provide a BOC signal acquisition and tracking method. The method comprises receiving a signal; generating a carrier; generating subcarriers including BOC subcarrier, QBOC subcarrier and harmonics thereof; removing a carrier component from said signal by using said carrier; mixing said signal with the subcarrier; and integrating the mixing result. In accordance with the present invention, the integration results for the respective subcarriers are combined to obtain a combined correlation. Alternatively, the subcarriers are combined as a synthesized subcarrier in advance. Then the received signal is mixed with the synthesized subcarrier and the integration of the mixing result is calculated.

BRIEF DESCRIPTION OF THE DRAWINGS

The present invention will be further described in details in conjunction with the accompanying drawings.

DETAILED DESCRIPTION OF THE INVENTION

Figure 1:
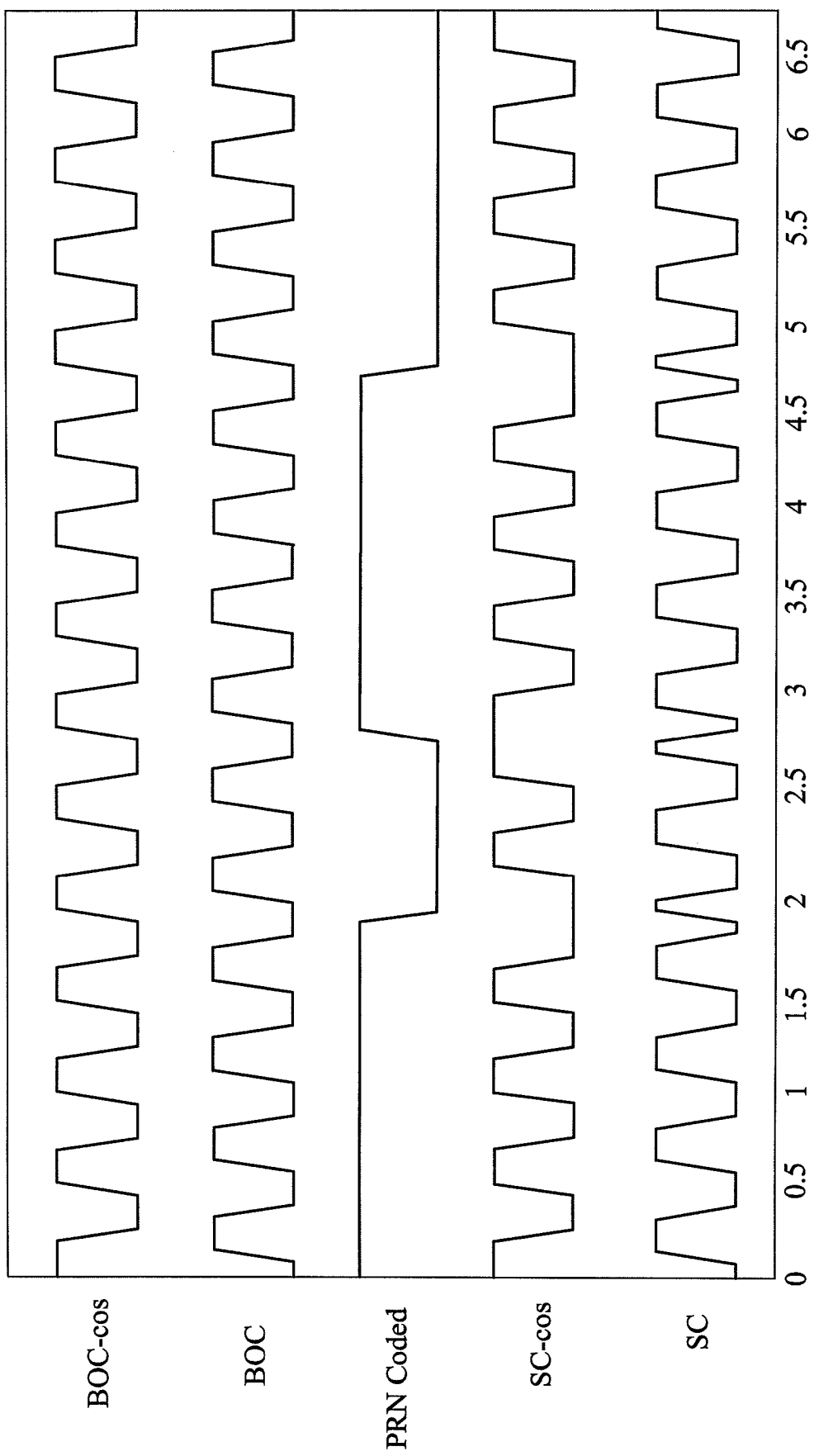
FIG. 1 is a waveform diagram showing generation of BOC and BOC-cos signals.
Figure 2:
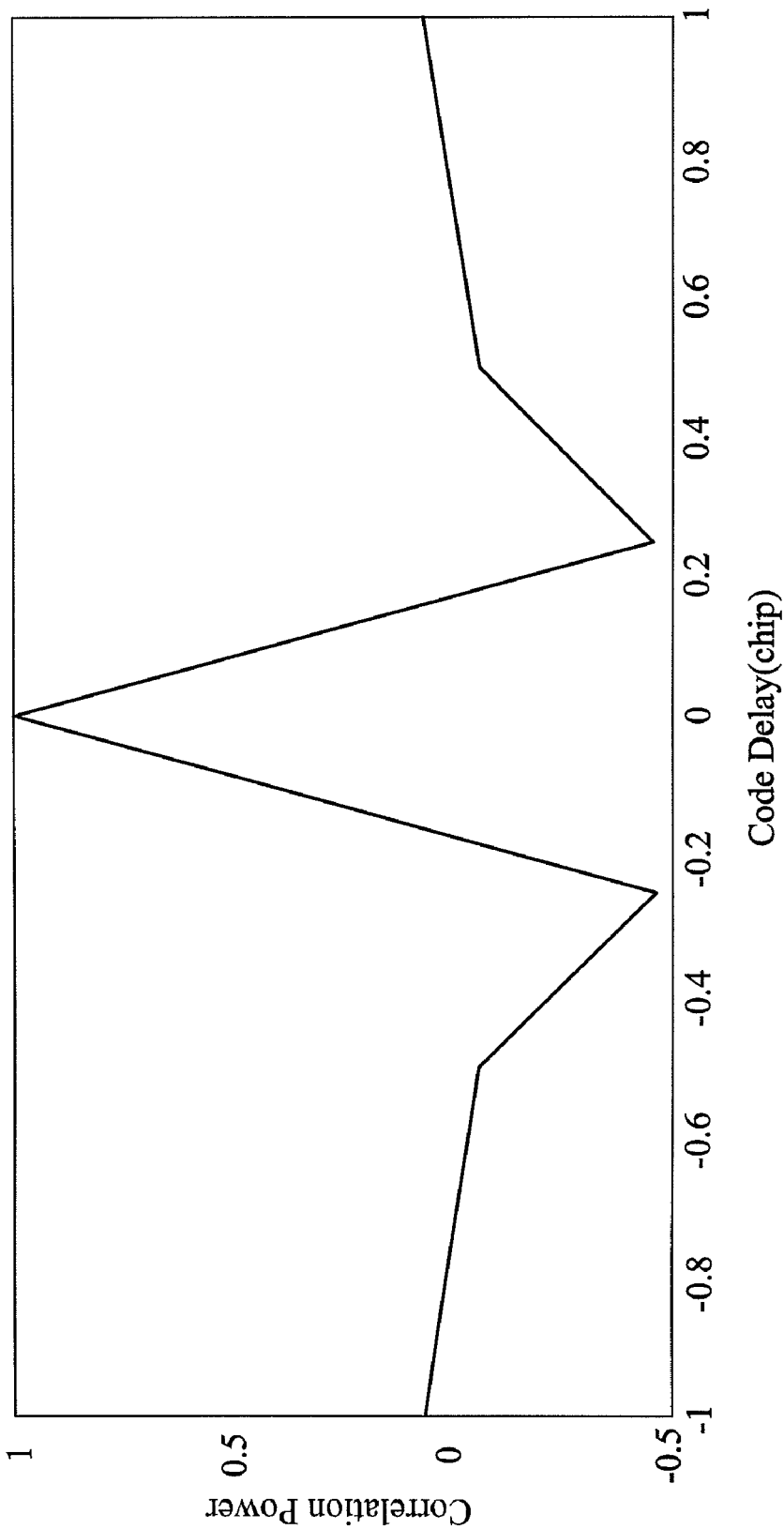
FIG. 2 shows correlation result of BOC (1,1) autocorrelation.
Figure 3:
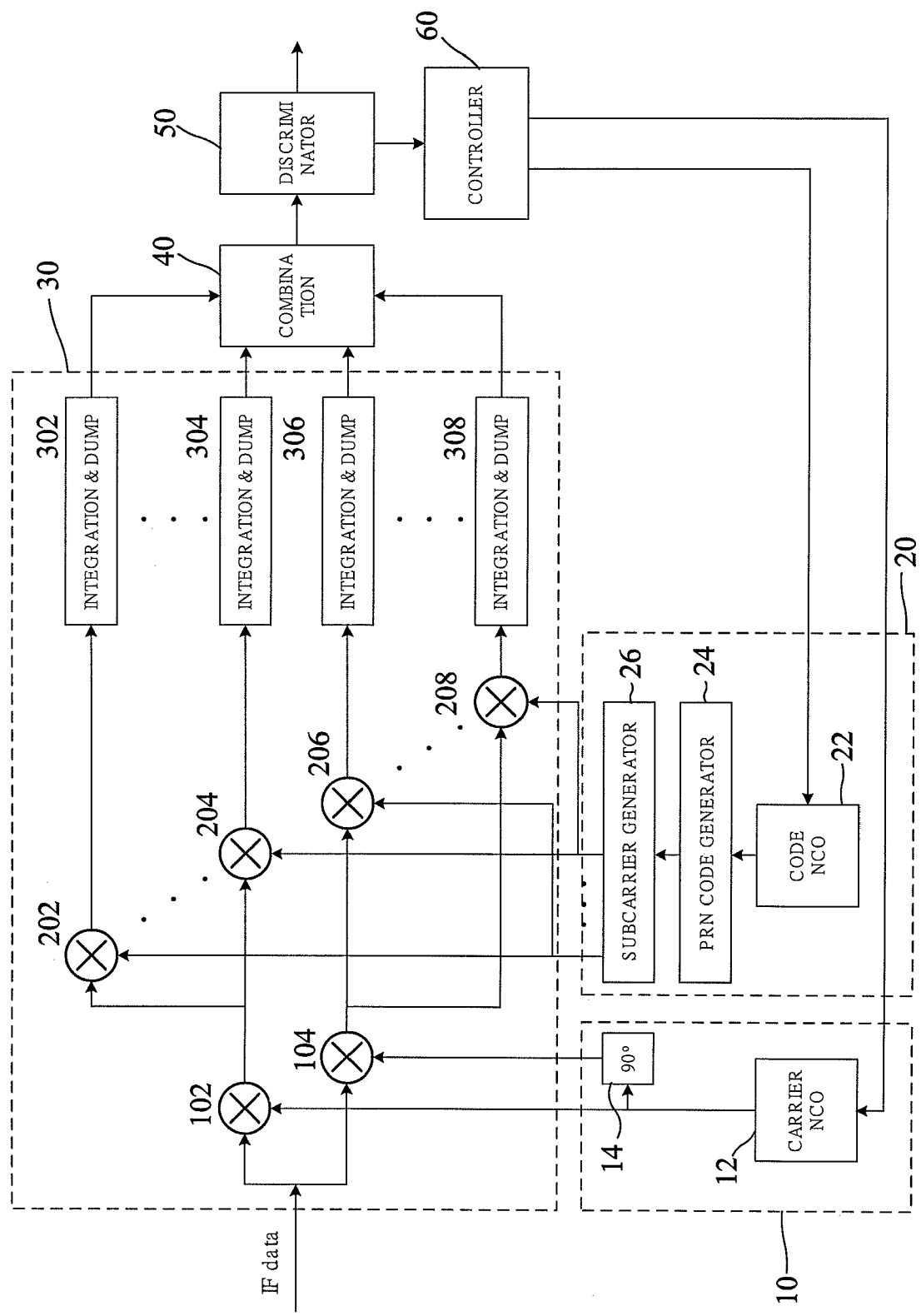
FIG. 3 is a block diagram showing a BOC signals acquisition and tracking apparatus in accordance with an embodiment of the present invention.

FIG. 3 is a block diagram showing a BOC signals acquisition and tracking apparatus in accordance with an embodiment of the present invention. The apparatus can be implemented as a portion of a GNSS signal receiver (e.g. a Galileo receiver). The apparatus receives incoming IF data from an RF frond end of the GNSS receiver, for example. Reference number 10 indicates a carrier unit, which provides a carrier signal to carrier mixers 102 and 104 to remove IF component from the data. The carrier signal can be generated by a local oscillator, which is implemented by a carrier numeral controlled oscillator 12. Reference number 14 indicates a phase shifter. The IF-removed signal in I and Q channels are then fed to mixers 202 and 204, 206 and 208, respectively. Block 20 is referred to as a code unit.

In accordance with the present invention, the code unit 20 comprises a code numeral controlled oscillator 22 for providing an oscillation signal, a PRN code generator 24 receiving the code signal from the code NCO 22 to generate the PRN code, and a subcarrier generator 26. In the present embodiment, the subcarrier 26 receives the PRN code to generate a BOC subcarrier, a quadrature-phase BOC (QBOC; also referred to as BOC-cos) subcarrier, a double frequency harmonic subcarrier of the BOC subcarrier, which can be represented as BOC-sin(2fs), and a double frequency harmonic subcarrier of the BOC-cos subcarrier, which can be represented as BOC-cos(2fs). The subcarriers are respectively fed to the mixers 202-208, so that BOC modulated signals are generated. In practice, one subcarrier is fed to a pair of mixers for I and Q channels. Accordingly, for this case, at the code stage, eight mixers are needed since there are four subcarriers. For the sake of simplification and clarification, only four mixers 202, 204, 206, 208 are shown in this drawing.

The outputs of the mixers 202, 204, 206, 208, which are referred to as code mixers, are fed into integration and dump units 302, 304, 306, 308, respectively, to be integrated and dumped. Then the integrated results from the integration and dump units 302, 304, 306, 308 are fed to a combination unit 40. The mixers 102, 104, mixers 202-208 and integration and dump units 302-308 compose a code delay block 30. The combination unit 40 combines the integration results to obtain a combination correlation, which will be further described in detail.

The combination result is then sent to a discriminator 50. The discriminator calculates a tracking error. The apparatus of the present invention further comprises a controller 60. The controller 60 receives the tracking error and outputs control signals to the carrier unit 10 and code unit 20 so as to adjust the carrier NCO 12 and code NCO 22, respectively, according to the tracking error. The controller can also be designed to control the code unit to output which ones of the QBOC subcarrier and the harmonics of the BOC and QBOC subcarriers.

Figure 5:
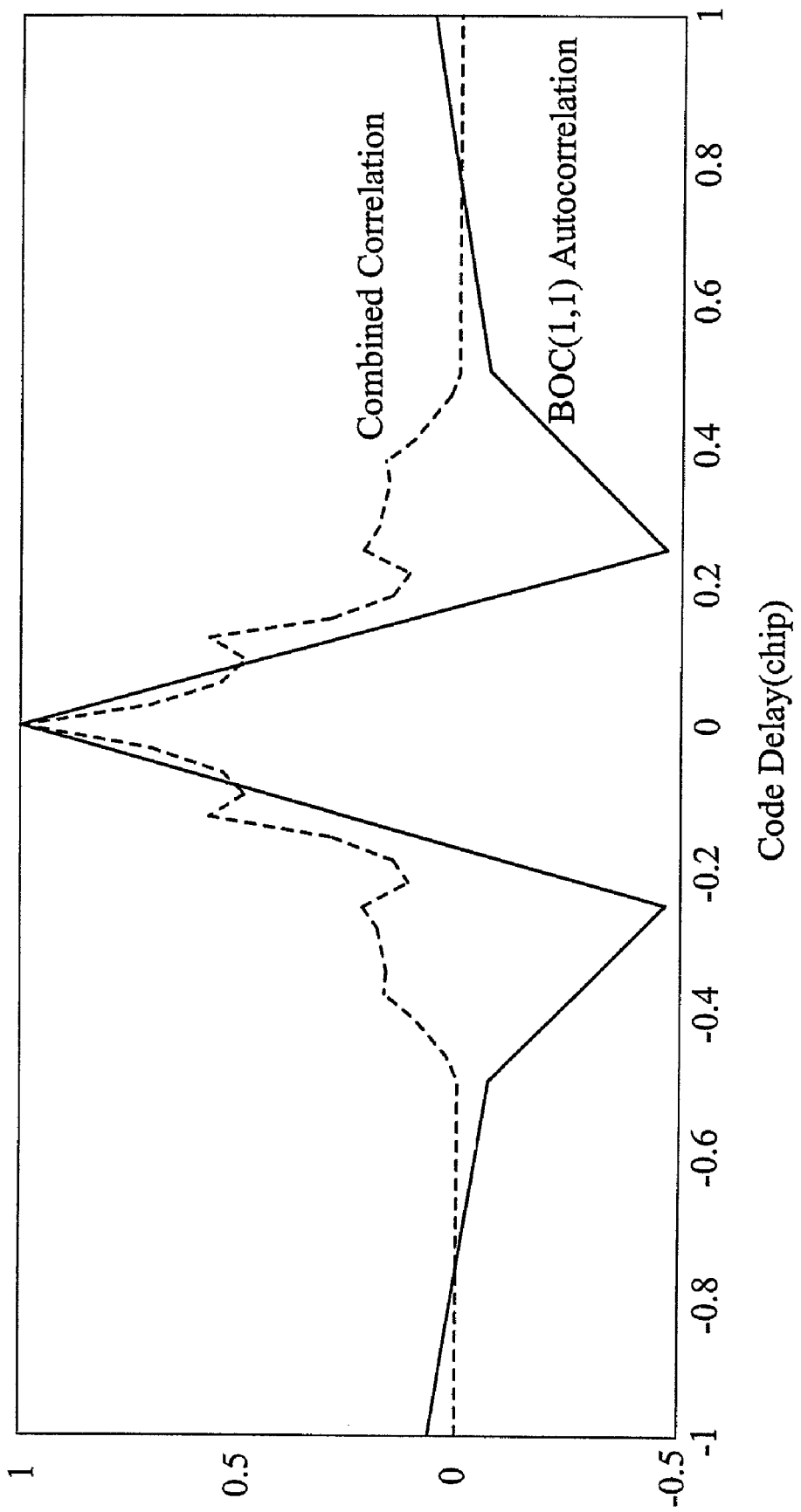
FIG. 5 shows correlation powers of autocorrelation of BOC (1,1) and a combined correlation obtained in accordance with the present invention.

In the combination unit 40, the correlation results of the respective signals are combined based on a predetermined algorithm such as a linear combination of squared correlation as follows:

$$R_{combi}=R_a+\alpha \times R_b+\beta \times R_c+\gamma \times R_d \qquad (1)$$

where $R_a=R^2_{BOC(1,1)/sin(fs)}$, square of BOC(1,1) autocorrelation power $R_b=R^2_{BOC(1,1)/cos(fs)}$, square of BOC(1,1)/BOC-cos(fs) cross-correlation power $R_c=R^2_{BOC(1,1)/sin(2fs)}$, square of BOC(1,1)/BOC-sin(2fs) cross-correlation power $R_d=R^2_{BOC(1,1)/cos(2fs)}$, square of BOC(1,1)/BOC-cos(2fs) cross-correlation power In this case, $\alpha=0.8$, $\beta=\gamma=1$. FIG. 5 shows $R_a$, (i.e. the autocorrelation of the BOC(1,1) signal) and the $R_{combi}$ obtained by means of the above equation. As can be easily observed from this drawing, the secondary peaks of BOC autocorrelation function is significantly depressed. In the present embodiment, the coefficients $\alpha$, $\beta$ and $\gamma$ are determined by the combination unit 40. However, the coefficient can also be provided from another component such as the controller 60 or stored therein.

Figure 4:
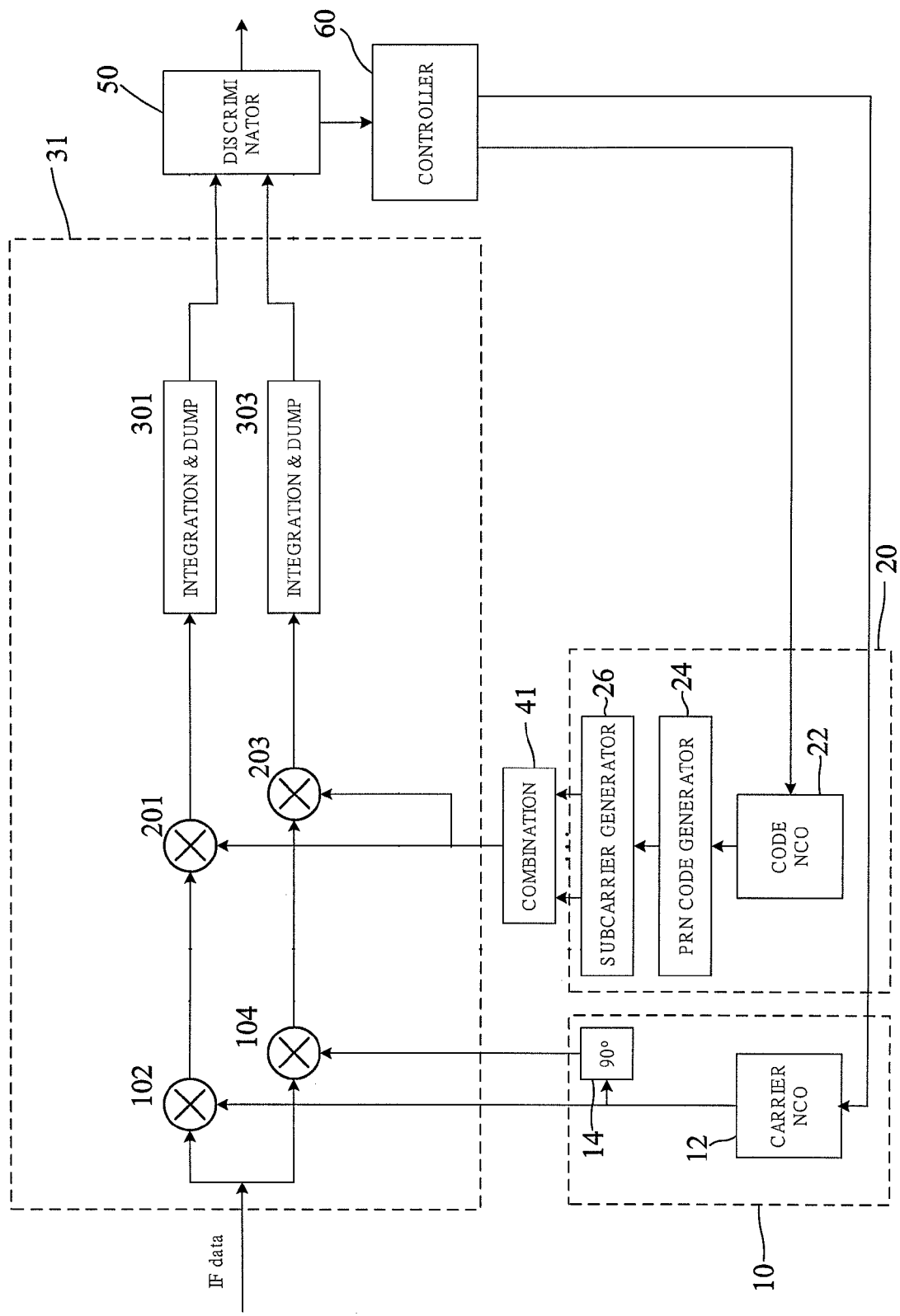
FIG. 4 is a block diagram showing a BOC signals acquisition and tracking apparatus in accordance with another embodiment of the present invention.

FIG. 4 is a block diagram showing a BOC signals acquisition and tracking apparatus in accordance with another embodiment of the present invention. The structure shown in FIG. 4 is similar to that in FIG. 3, the same reference numbers indicate the same components, and therefore the descriptions thereof are omitted herein to avoid redundancy. The apparatus of the present embodiment has a combination unit 41 rather than the combination unit 40. The combination unit 41 receives subcarriers generated by the subcarrier generator 26 and synthesizes the subcarriers based on a built-in algorithm. That is, the BOC subcarrier, QBOC subcarrier and the harmonics thereof are combined in advance. Then the synthesized subcarrier is provided to code mixers 201, 203 of I and Q channels. Since the subcarriers have been synthesized into one, only a pair of code mixers for I and Q channels are needed. The outputs of the code mixers 201, 203 are fed to integration and dump units 301, 303 for respectively integrating the mixing results of I and Q channels. The outputs of the integration and dump units 301, 303 are sent to the discriminator 50 to calculate the tracking error. The carrier mixers 102, 104, code mixers 201, 203, and integration and dump units 301, 303 compose a code delay block 31. By synthesizing the subcarriers in advance, the complexity of the hardware can be reduced.

If the subcarriers generated by the subcarrier generator are BOC(1,1)-sin(fs) (usually simply referred to as BOC(1,1)), BOC(1,1)-cos(fs) (also referred to as QBOC(1,1)), BOC(1,2)-sin (i.e. BOC-sin(2fs)) and BOC(1,2)-cos (i.e. BOC-cos(2fs)), then the resultant correlation power is:

$$R_{combi}=R^2_{BOC(1,1)[sin(fs)+\alpha\ cos(fs)+\beta\ sin(2fs)+\gamma\ cos(2fs)}\qquad (2)$$

The coefficients $\alpha$, $\beta$, $\gamma$ are determined by the combination unit 41 in the present embodiment. However, those coefficient can also be determined by the controller 60 or externally given. The power curve obtained by this scheme is similar to that shown in FIG. 5.

Although in the above embodiment, in addition to the BOC(1,1) subcarrier per se, the quadrature subcarrier thereof (QBOC), and double frequency harmonics of the BOC and QBOC subcarriers are utilized, other harmonics such as higher level harmonics of the BOC subcarrier and/or the QBOC subcarrier can be used. Furthermore, it is also possible not to use QBOC subcarrier and/or harmonic(s) thereof, for example, that is, the coefficient(s) thereof is (are) set as zero. The flexibility of selection among those subcarriers is not limited.

While the preferred embodiment of the present invention has been illustrated and described in details, various modifications and alterations can be made by persons skilled in this art. The embodiment of the present invention is therefore described in an illustrative but not in a restrictive sense. It is intended that the present invention should not be limited to the particular forms as illustrated, and that all modifications and alterations which maintain the spirit and realm of the present invention are within the scope as defined in the appended claims.

What is claimed is:

1. A BOC signal acquisition and tracking apparatus comprising:
    a carrier unit generating a carrier;
    a code unit generating subcarriers including a BOC subcarrier and at least one harmonic thereof; and
    a code delay block receiving a signal, removing a carrier component from said signal by using said carrier from the carrier unit to generate a resultant signal, mixing the resultant signal with the subcarriers from said code unit, and integrating each mixing result.

2. The apparatus of claim 1 further comprising a combination unit combining the integration results from the code delay block to obtain a combined correlation.

3. The apparatus of claim 2, wherein the combination unit combines the integration results with specific coefficients.

4. The apparatus of claim 3, wherein the coefficients can be any real number.

5. The apparatus of claim 3, wherein the coefficients are determined by the combination unit.

6. The apparatus of claim 3, wherein the coefficients are given to the combination unit.

7. The apparatus of claim 2, further comprising a discriminator calculating a tracking error according to the combined correlation.

8. The apparatus of claim 1, further comprising a combination unit combining the subcarriers generated by the code unit to generate a synthesized subcarrier, wherein said code delay block mixing the resultant signal with the synthesized subcarrier and integrating the mixing result to obtain a synthesized correlation.

9. The apparatus of claim 1, wherein the subcarriers generated by the code unit further include quadrature BOC (QBOC) subcarrier of the BOC subcarrier.

10. The apparatus of claim 9, wherein the subcarriers generated by the code unit further include at least one harmonic of the QBOC subcarrier.

11. The apparatus of claim 1, further comprising a controller controlling said code unit.

12. The apparatus of claim 11, wherein said code unit is controlled by said controller to output which ones of BOC subcarrier, QBOC subcarrier and harmonics thereof.

13. The apparatus of claim 1, wherein said code unit comprises an oscillator generating an oscillation signal, a PRN code generator generating a PRN code based on the oscillation signal and a subcarrier generator generating the subcarriers according to the PRN code.

14. A BOC signal acquisition and tracking method comprising steps of:
    receiving a signal;
    generating a carrier;
    generating subcarriers including a BOC subcarrier and at least one harmonic thereof;
    removing a carrier component from said signal by using said carrier to generate a resultant signal;
    mixing said resultant signal with the subcarriers; and
    integrating each mixing result.

15. The method of claim 14, further comprising a combining step combining the integration result for each subcarrier.

16. The method of claim 15, wherein the integration results are combined with specific coefficients.

17. The method of claim 16, further comprising a step of determining the coefficients.

18. The method of claim 14 further comprising a step of combining said subcarriers as a synthesized subcarrier, and wherein the resultant signal is mixing with the synthesized subcarrier in the mixing step.

19. The method of claim 14, wherein the subcarriers further include quadrature BOC (QBOC) subcarrier of the BOC subcarrier.

20. The method of claim 19, wherein the subcarriers further include at least one harmonic of the QBOC subcarrier.

* * * * *